(12) United States Patent
Lim et al.

(10) Patent No.: US 10,969,569 B2
(45) Date of Patent: Apr. 6, 2021

(54) LIGHT SOURCE-INTEGRATED LENS ASSEMBLY AND OPTICAL APPARATUS INCLUDING THE SAME

(71) Applicant: WeTHE Lab Co., Ltd., Seoul (KR)

(72) Inventors: Dong Cheol Lim, Incheon (KR); Jungkeun Lee, Yongin-si (KR)

(73) Assignee: WeTHE Lab Co., Ltd., Seoul (KR)

( * ) Notice: Subject to any disclaimer, the term of this patent is extended or adjusted under 35 U.S.C. 154(b) by 0 days.

(21) Appl. No.: 16/809,973

(22) Filed: Mar. 5, 2020

(65) Prior Publication Data

US 2020/0201009 A1    Jun. 25, 2020

Related U.S. Application Data

(63) Continuation-in-part of application No. 16/021,445, filed on Jun. 28, 2018, now Pat. No. 10,620,046, (Continued)

(30) Foreign Application Priority Data

Dec. 28, 2015    (KR) ........................ 10-2015-0187436

(51) Int. Cl.
*G02B 19/00* (2006.01)
*G02B 5/00* (2006.01)
(Continued)

(52) U.S. Cl.
CPC ....... *G02B 19/0047* (2013.01); *G01N 21/255* (2013.01); *G01N 21/359* (2013.01);
(Continued)

(58) Field of Classification Search
CPC ........ G01J 3/0208; G01J 3/0262; G01J 3/108; G01J 3/02; G01J 3/28; G01N 21/359;
(Continued)

(56) References Cited

U.S. PATENT DOCUMENTS 4,131,540 A    12/1978 Husome et al.
4,350,442 A    9/1982 Arild et al.
(Continued)

FOREIGN PATENT DOCUMENTS

KR    10-2004-0015157 A    2/2004
KR    10-1397158 B1    5/2014

*Primary Examiner* — Sang H Nguyen
(74) *Attorney, Agent, or Firm* — Rabin & Berdo, P.C.

(57) ABSTRACT

A light source-integrated lens assembly includes a lens including first through hole at its center along optical axis, an internal light shielding member including second through hole at its center and first protrusion that protrudes from front surface of the lens, and a light emitting element configured to emit light to target object. The internal light shielding member is fitted into the first through hole and the light emitting element is fitted into the second through hole to form a single integrated unit. The lens receives light emitted from the light emitting element and diffused and reflected from inside the target object. When the internal light shielding member is brought into contact with surface of the target object, the internal light shielding member prevents light emitted from the light emitting element and directly reflected at the surface of the target object from being incident on the lens.

21 Claims, 20 Drawing Sheets

Related U.S. Application Data which is a continuation of application No. PCT/KR2016/014181, filed on Dec. 5, 2016.

(51) Int. Cl.
- *G01N 21/3563* (2014.01)
- *G01N 21/25* (2006.01)
- *G01N 21/84* (2006.01)
- *G01N 21/359* (2014.01)

(52) U.S. Cl.
CPC ......... G01N 21/3563 (2013.01); G01N 21/84 (2013.01); G02B 5/003 (2013.01); G02B 19/0009 (2013.01); *G01N 2201/061* (2013.01); *G02B 19/009* (2013.01)

(58) Field of Classification Search
CPC ......... G01N 33/025; G01N 2201/0221; G01N 21/225; G01N 21/3563; G01N 21/84; G01N 2201/061; G02B 19/047; G02B 19/0009; G02B 5/003
See application file for complete search history.

(56) References Cited

U.S. PATENT DOCUMENTS

| | | |
|---|---|---|
| 4,897,536 A | 1/1990 | Miyoshi |
| 6,137,581 A | 10/2000 | Kimura et al. |
| 7,068,368 B1 | 6/2006 | Nagayoshi et al. |
| 2002/0011567 A1 | 1/2002 | Ozanich |
| 2002/0167652 A1* | 11/2002 | Ueyama .................. G03B 27/32 355/67 |
| 2003/0213894 A1 | 11/2003 | Muller |
| 2004/0130720 A1 | 7/2004 | Maeda et al. |
| 2006/0118726 A1 | 6/2006 | Kawabata et al. |
| 2007/0229832 A1 | 10/2007 | Maeda |
| 2009/0147260 A1 | 6/2009 | Costa et al. |
| 2011/0097073 A1* | 4/2011 | Lee ........................ G03B 17/00 396/533 |
| 2013/0279031 A1* | 10/2013 | Chou ....................... G02B 7/04 359/824 |
| 2014/0368723 A1* | 12/2014 | Jung .................... H04N 5/2257 348/340 |
| 2015/0332908 A1 | 11/2015 | Blondia |
| 2016/0006912 A1* | 1/2016 | Kim ..................... H04N 5/2257 348/374 |

* cited by examiner

LIGHT SOURCE-INTEGRATED LENS ASSEMBLY AND OPTICAL APPARATUS INCLUDING THE SAME

CROSS-REFERENCE TO RELATED APPLICATIONS

This application is a continuation-in-part of U.S. application Ser. No. 16/021,445, filed Jun. 28, 2018, which is a continuation of International Application No. PCT/KR2016/014181, filed Dec. 5, 2016, which is based upon and claims the benefit of priority from Korean Patent Application No. 10-2015-0187436, filed Dec. 28, 2015, which is now Korean Patent No. 10-1690073, the contents of which are incorporated herein by reference in their entirety.

BACKGROUND

1. Field

The present invention relates to a light source-integrated lens assembly and an optical apparatus including the lens assembly.

2. Description of the Related Art

A near-infrared spectroscopic analyzing apparatus generally includes a broadband light source for emitting light to an object to be tested, a light collecting member for collecting (focusing) light reflected mainly from inside the object, and a spectrometer for detecting absorbance wavelength spectra of the light collected (focused) by the light collecting member.

This type of spectroscopic analyzing apparatus creates a correlation between the absorbance wavelength spectra and components of the object with a calibration model equation using regression analysis and appropriate mathematical pre-processing and correction, thus being capable of measuring physical and chemical properties inside the object in a nondestructive manner without a pretreatment of the object.

An example of such spectroscopic analyzing apparatus is an apparatus for measuring sugar contents of fruits in a nondestructive manner.

The internal quality of a fruit, such as the sugar contents, not only has a large individual difference due to varieties, harvest time, and differences in cultivation environments and techniques but also has a difference even among fruits harvested from the same tree. Therefore, it can be said that it is indispensable to develop an appropriate cultivation technique through a real-time sugar contents measurement of a fruit at a cultivation stage or stages before and after harvest and an apparatus for measuring the sugar contents in a nondestructive manner as a means for improving the fruit quality by determining proper time of harvesting.

A conventional technique related to a spectroscopic apparatus for measuring the sugar contents of a fruit in a nondestructive manner includes a portable apparatus for testing internal quality described in Korean Patent Laid-Open Publication No. 10-2004-0015157.

The portable apparatus for testing internal quality described in Korean Patent Laid-Open Publication No. 10-2004-0015157 focuses light, which is emitted from a light source to an object to be tested and diffused and reflected from inside the object, with a bunch of optical fibers and transmits the focused light to a spectrometer.

The portable apparatus for testing internal quality described in Korean Patent Laid-Open Publication No. 10-2004-0015157 employs a bundle of optical fibers parallelly arranged at an input slit of the spectrometer, causing problems of securing a relatively large space, arranging the optical fibers in the secured space, which is not easy, and coupling the diffused and reflected light into the optical fibers, which is not easy, either.

Another example of the spectroscopic apparatus for measuring the sugar contents of a fruit in a nondestructive manner is a portable apparatus for measuring sugar contents of tangerine in a nondestructive manner described in Korean Patent No. 10-1397158.

The portable apparatus for measuring sugar contents of tangerine in a nondestructive manner described in Korean Patent No. 10-1397158 includes a light emitting unit for emitting light to an object and a light receiving unit (lens) for focusing light diffused and reflected from inside the object, arranged laterally in parallel.

With a structure in which the light emitting unit and the light receiving unit are arranged laterally in parallel, when a distance between the light emitting unit and the light receiving unit increases, a measurement result is greatly affected by size and shape of the object, and when the distance between the light emitting unit and the light receiving unit decreases, a depth of penetration of the light into the object decreases, generating a light interference, which can cause a large error in measured sugar contents. In addition, as this structure arranges the light emitting unit and the light receiving unit in parallel, it is required to secure a space for mounting each of the light emitting unit and the light receiving unit, resulting in an increase of a volume of the spectroscopic analyzing apparatus.

SUMMARY

According to some embodiments of the present invention, a light source-integrated lens assembly includes a lens including a first through hole at its center along an optical axis thereof, an internal light shielding member including a second through hole at its center along the optical axis and a first protrusion that protrudes from a front surface of the lens, the front surface facing a target object, and a light emitting element configured to emit light to the target object. The internal light shielding member is fitted into the first through hole of the lens and the light emitting element is fitted into the second through hole of the internal light shielding member to form a single integrated unit. The lens is configured to receive light emitted from the light emitting element and diffused and reflected from inside the target object. When the internal light shielding member is brought into contact with a surface of the target object, the internal light shielding member is configured to prevent light emitted from the light emitting element and directly reflected at the surface of the target object from being incident on the lens.

Further, according to some embodiments of the present invention, a light source-integrated lens assembly includes a lens including a first through hole at its center along an optical axis thereof, an internal light shielding member including a second through hole at its center along the optical axis, and a light emitting element configured to emit light to a target object. An outer diameter of the internal light shielding member is substantially same as an inner diameter of the first through hole. An outer diameter of the light emitting element is substantially same as an inner diameter of the internal light shielding member. The internal light shielding member is fitted into the first through hole of the lens and the light emitting element is fitted into the second through hole of the internal light shielding member, such that the light emitting element, the internal light shielding member, and the lens are integrated into a single unit in a concentric manner centering around the optical axis.

Moreover, according to some embodiments of the present invention, a light source-integrated lens assembly array includes a plurality of light source-integrated lens assemblies of a same type as the light source-integrated lens assembly according to some embodiments of the present invention. The light source-integrated lens assemblies are arranged in an array of a predetermined pattern on a two-dimensional plane.

Further, according to some embodiments of the present invention, an optical apparatus includes the light source-integrated lens assembly according to some embodiments of the present invention.

Moreover, according to some embodiments of the present invention, an optical apparatus includes the light source-integrated lens assembly array according to some embodiments of the present invention.

Although the respective embodiments are described herein independently, the respective embodiments can be mutually combined, and the combined embodiments are also included in the scope of the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE SOME EMBODIMENTS

Exemplary embodiments of the present invention are described in detail below with reference to the accompanying drawings.

Figure 1:
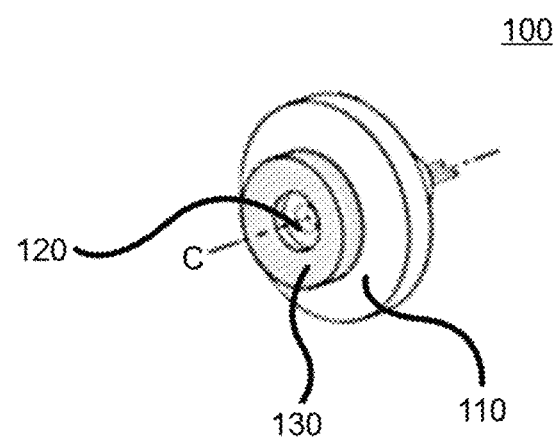
FIG. 1 is a perspective view of a light source-integrated lens assembly according to some embodiments of the present invention.
Figure 2:
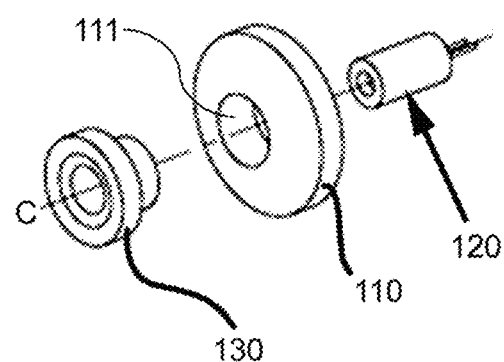
FIG. 2 is an exploded perspective view of the light source-integrated lens assembly shown in FIG. 1.
Figure 3:
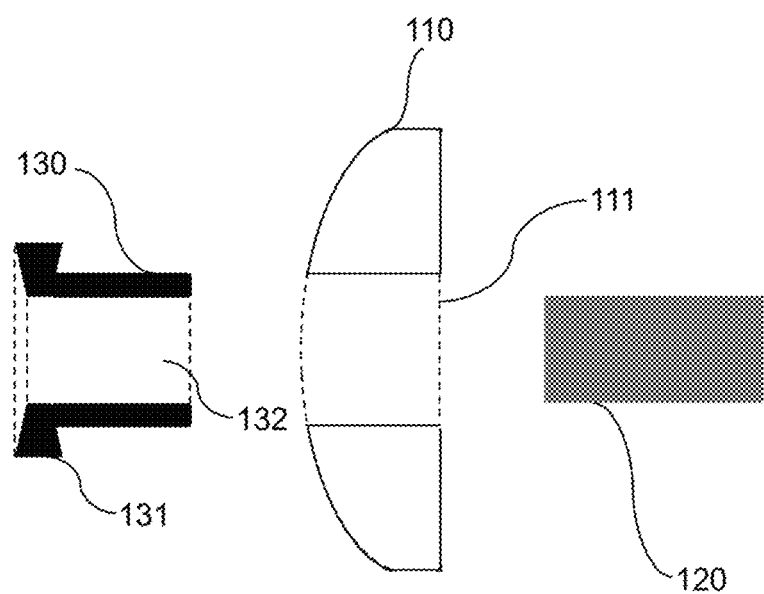
FIG. 3 is an exploded lateral cross-sectional view of the light source-integrated lens assembly shown in FIG. 1.
Figure 4A:
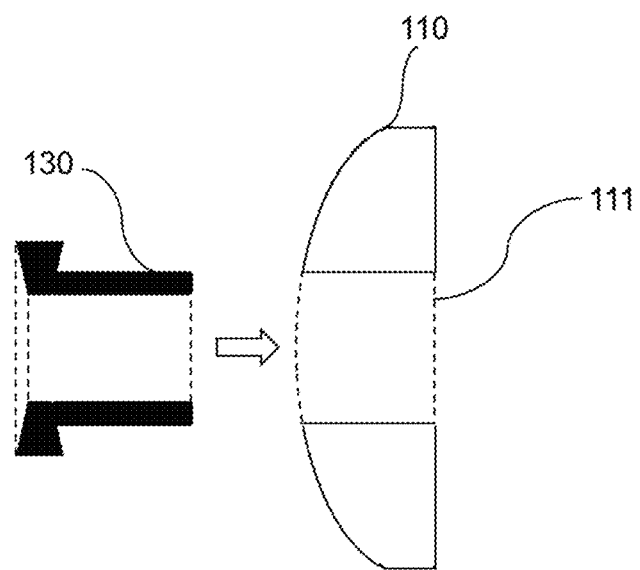
FIG. 4A is a lateral cross-sectional view of an internal light shielding member being fitted into a through hole of a lens of the light source-integrated lens assembly.
Figure 4B:
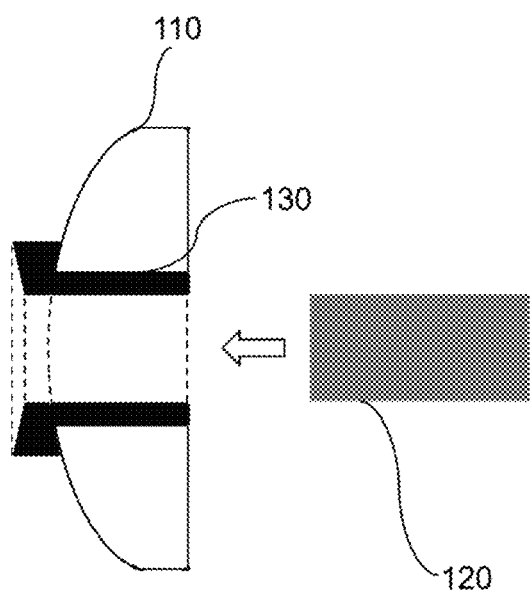
FIG. 4B is a lateral cross-sectional view of a light emitting element (light source) being fitted into an assembly of the internal light shielding member and the lens.
Figure 5A:
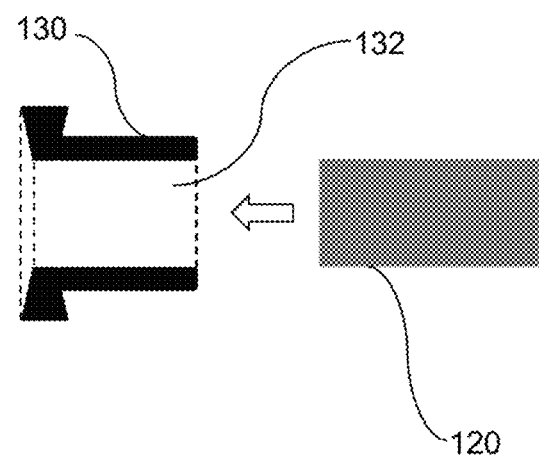
FIG. 5A is a lateral cross-sectional view of a light emitting element (light source) being fitted into an internal light shielding member of the light source-integrated lens assembly.
Figure 5B:
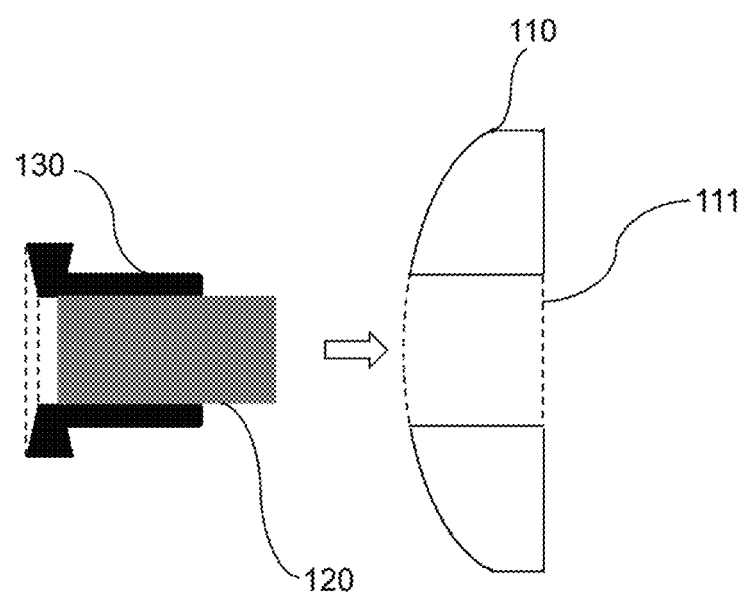
FIG. 5B is a lateral cross-sectional view of an assembly of the light emitting element (light source) and the internal light shielding member being fitted into a through hole of a lens of the light source-integrated lens assembly.
Figure 6A:
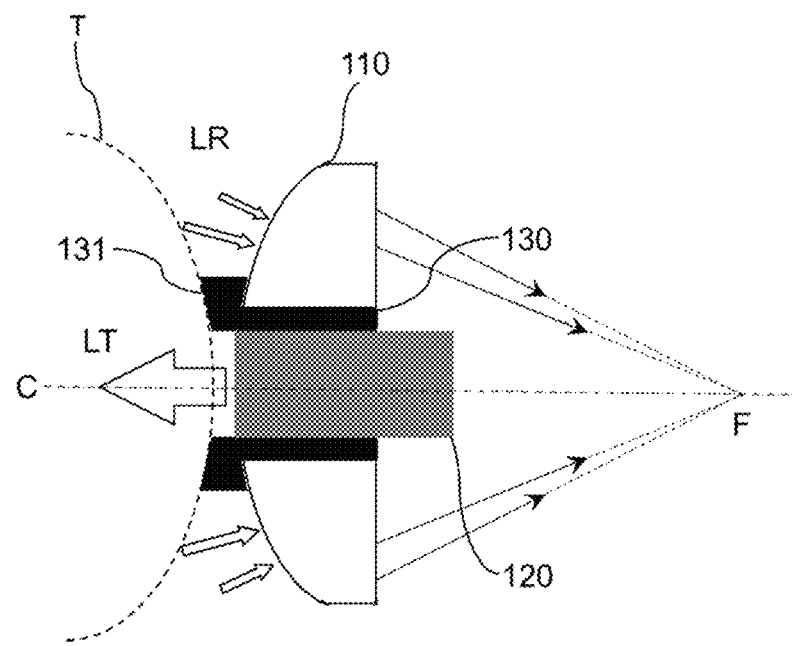
FIG. 6A is a lateral cross-sectional view of the light source-integrated lens assembly shown in FIG. 1, making contact with a surface of a target object.
Figure 6B:
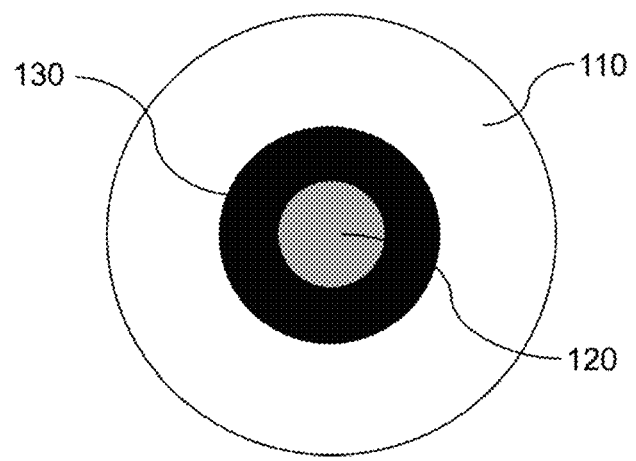
FIG. 6B is a front view of the light source-integrated lens assembly shown in FIG. 1.
Figure 7A:
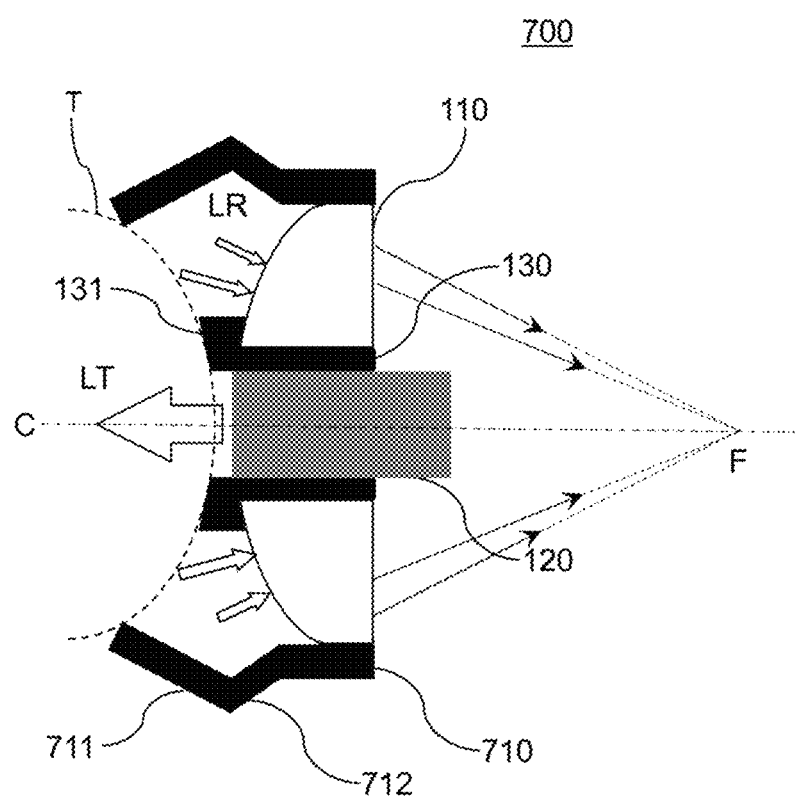
FIG. 7A is a lateral cross-sectional view of a light source-integrated lens assembly according to some embodiments of the present invention, making contact with a surface of a target object.
Figure 7B:
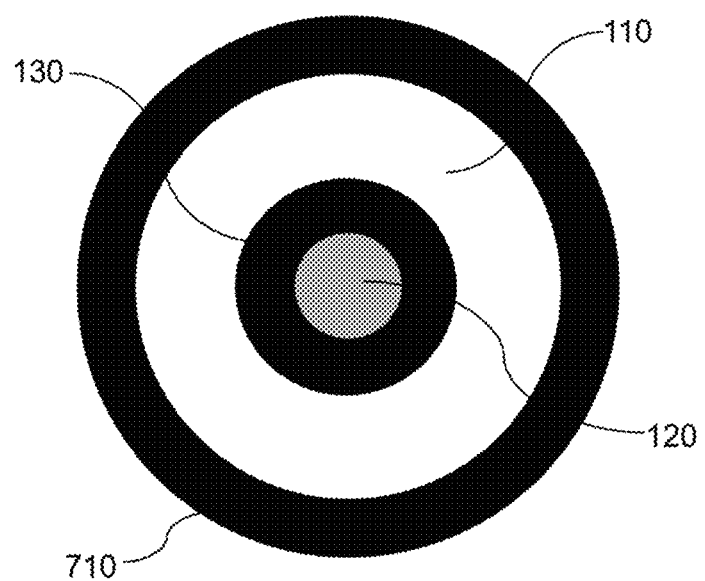
FIG. 7B is a front view of the light source-integrated lens assembly shown in FIG. 7A.

FIG. 1 is a perspective view of a light source-integrated lens assembly according to some embodiments of the present invention. FIG. 2 is an exploded perspective view of the light source-integrated lens assembly shown in FIG. 1. FIG. 3 is an exploded lateral cross-sectional view of the light source-integrated lens assembly shown in FIG. 1. FIG. 4A is a lateral cross-sectional view of an internal light shielding member being fitted into a through hole of a lens of the light source-integrated lens assembly. FIG. 4B is a lateral cross-sectional view of a light emitting element (light source) being fitted into an assembly of the internal light shielding member and the lens. FIG. 5A is a lateral cross-sectional view of a light emitting element (light source) being fitted into an internal light shielding member of the light source-integrated lens assembly. FIG. 5B is a lateral cross-sectional view of an assembly of the light emitting element (light source) and the internal light shielding member being fitted into a through hole of a lens of the light source-integrated lens assembly. FIG. 6A is a lateral cross-sectional view of the light source-integrated lens assembly shown in FIG. 1, making contact with a surface of a target object. FIG. 6B is a front view of the light source-integrated lens assembly shown in FIG. 1. FIG. 7A is a lateral cross-sectional view of a light source-integrated lens assembly according to some embodiments of the present invention, making contact with a surface of a target object. FIG. 7B is a front view of the light source-integrated lens assembly shown in FIG. 7A.

As shown in FIGS. 1 to 7B, a light source-integrated lens assembly 100 according to some embodiments of the present invention includes a lens 110 including a first through hole 111 at its center along an optical axis C, an internal light shielding member 130 inserted (fitted) into the first through hole 111, which includes a second through hole 132 at its center along the optical axis c and a first protrusion 131 that protrudes from a front surface of the lens 110 when the internal light shielding member 130 is fitted into the first through hole 111 of the lens 110, and a light emitting element 120 fitted into the second through hole 132 of the internal light shielding member 130 and configured to emit light to a target object T.

The lens 110 is configured to receive light emitted from the light emitting element 120 and diffused and reflected from inside the target object T.

When the internal light shielding member 130 is brought into contact with a surface of the target object T, as shown in FIG. 6A, the internal light shielding member 130 is configured to prevent light emitted from the light emitting element 120 and directly reflected at a surface of the target object T from being incident on the lens 110.

In some embodiments of the present invention, the first protrusion 131 of the internal light shielding member 130 can be omitted. In this case, a light emitting facet of the light emitting element 120 can be embedded in the lens 110 such that a contour the target object T and a contour of the lens 110 can be circumscribe when being brought into contact with each other for measurement.

In some embodiments of the present invention, at least the first protrusion 131 of the internal light shielding member 130 is formed of an elastic material, such that the internal light shielding member 130 makes well contact with the surface of the target object T even when the surface of the target object T is irregular, and configured to prevent light emitted from the light emitting element 120 and reflected at the surface or a shallow depth of the target object T from being incident on the lens 110.

With this structure, the light source-integrated lens assembly 100 according to some embodiments of the present invention allows the light diffused and reflected from relatively deep inside the target object T to be received by the lens 110, while excluding the light reflected at the surface of the shallow depth of the target object T, to improve the efficiency in measuring the internal property of the target object T.

In some embodiments of the present invention, an outer diameter of the internal light shielding member 130 is substantially same as an inner diameter of the first through hole 111. An outer diameter of the light emitting element 120 is substantially same as an inner diameter of the second through hole 132.

The description that the outer diameter of the internal light shielding member 130 is substantially same as the inner diameter of the first through hole 111 means the outer diameter of the internal light shielding member 130 is smaller than the inner diameter of the first through hole 111 such that the internal light shielding member 130 can be fitted into the first through hole 111 but the difference between the outer diameter of the internal light shielding member 130 and the inner diameter of the first through hole 111 is as small as to keep the state of the internal light shielding member 130 being fitted into the inner diameter of the first through hole 111.

In the same manner, the description that the outer diameter of the light emitting element 120 is substantially same as the inner diameter of the second through hole 132 means the outer diameter of the light emitting element 120 is smaller than the inner diameter of the second through hole 132 such that the light emitting element 120 can be fitted into the second through hole 132 but the difference between the outer diameter of the light emitting element 120 and the inner diameter of the second through hole 132 is as small as to keep the state of the light emitting element 120 being fitted into the inner diameter of the second through hole 132.

Therefore, as shown in FIGS. 4A to 5B, the light emitting element 120 is fitted into the second through hole 132 of the internal light shielding member 130 in a tight manner, and the internal light shielding member 130 is fitted into the first through hole 111 of the lens 110 in a tight manner, such that the light emitting element 120, the internal light shielding member 130, and the lens 110 are integrated into a single unit in a concentric manner centering around the optical axis C, as shown in FIGS. 6A and 6B.

In the example shown in FIGS. 4A and 4B, the internal light shielding member 130 is fitted into the first through hole 111 of the lens 110, and then the light emitting element 120 is fitted into the second through hole 132 of the internal light shielding member 130.

In the example shown in FIGS. 5A and 5B, the light emitting element 120 is fitted into the second through hole 132 of the internal light shielding member 130, and then the internal light shielding member 130 is fitted into the first through hole 111 of the lens 110. In either way, the light emitting element 120, the internal light shielding member 130, and the lens 110 are tightly integrated into a single unit in a concentric manner centering around the optical axis C.

As shown in FIG. 6A, when measuring optical properties of the target object T, the internal light shielding member 130 is brought into contact with the surface of the target object T, the light emitting element 120 emits light to the target object T, and the lens 110 receives light diffused and reflected from inside the target object T. At this time, the internal light shielding member 130 prevents light emitted from the light emitting element 120 and directly reflected at the surface of the target object T from being incident on the lens 110.

With the above structure, the front view of the light source-integrated lens assembly 100 shows the light emitting element 120, the internal light shielding member 130, and the lens 110 integrated into a single unit in a concentric manner centering around the optical axis C, as shown in FIG. 6B.

As shown in FIGS. 7A and 7B, a light source-integrated lens assembly 700 according to some embodiments of the present invention further includes an external light shielding member 710 surrounding an outer circumference of the lens 110. The external light shielding member 710 includes a second protrusion 711 that protrudes from the front surface of the lens 110.

When the external light shielding member 710 is brought into contact with the surface of the target object T, the external light shielding member 710 is configured to prevent external light from being incident on the lens 110.

In some embodiments of the present invention, at least the second protrusion 711 of the external light shielding member 710 is formed of an elastic material and configured to prevent external natural light or scattered light from being incident on the lens 110, such that the lens 110 is free from a penetration of such external light.

In some embodiments of the present invention, at least the second protrusion 711 of the external light shielding member 710 is formed of an elastic material, such that the external light shielding member 710 makes well contact with the surface of the target object T even when the surface of the target object T is irregular.

In some embodiments of the present invention, the second protrusion 711 of the external light shielding member 710 protrudes farther than the first protrusion 131 of the internal light shielding member 130 toward the target object T.

In some embodiments of the present invention, the second protrusion 711 of the external light shielding member 710 includes a folding portion 712 that is foldable when an external force is applied. With this structure, the external light shielding member 710 makes well contact with the surface of the target object T even when the surface of the target object T is irregular.

When the internal light shielding member 130 and the external light shielding member 710 are brought into contact with the surface of the target object T, the first protrusion 131 of the internal light shielding member 130 and the second protrusion 711 of the external light shielding member 710 are configured to form a confined space between the surface of the target object and the front surface of the lens.

With this structure, the light emitted from the light emitting element 120 and directly reflected at the surface of the target object T is prevented from being incident on the lens 110, and the external light is prevented from being incident on the lens 110, such that an influence of any noise is minimized on signal light received by the lens 110.

Figure 8:
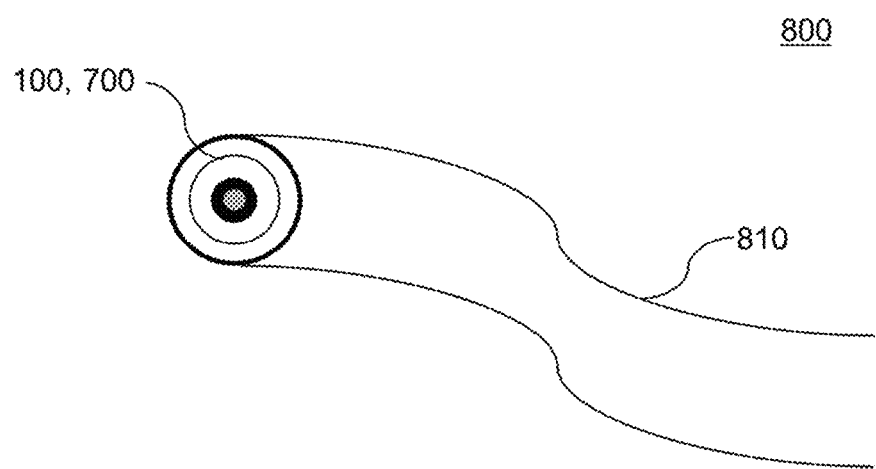
FIG. 8 is a schematic diagram of an optical apparatus including a light source-integrated lens assembly according to some embodiments of the present invention.
Figure 9:
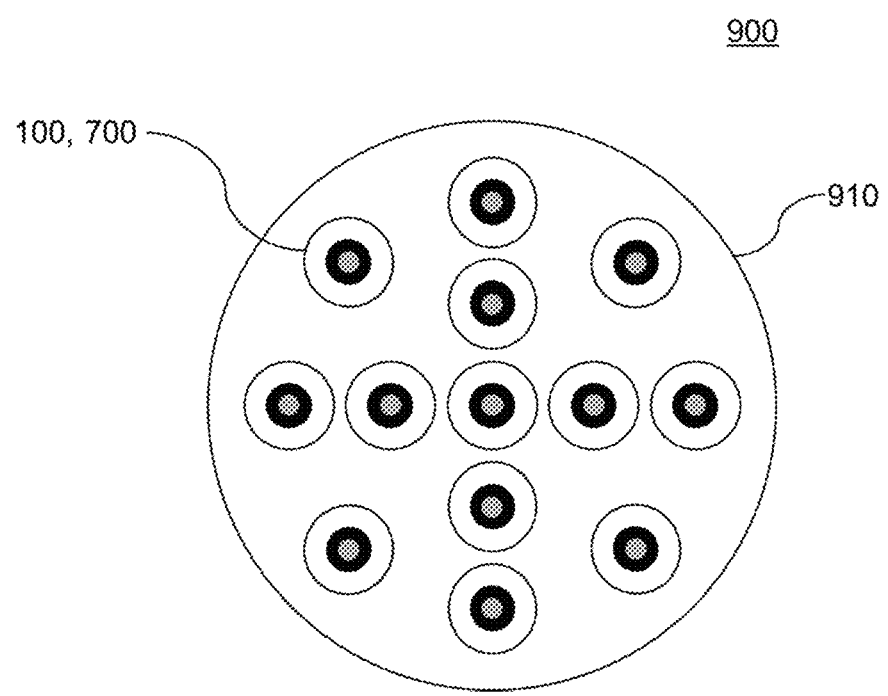
FIG. 9 is a schematic diagram of an optical apparatus including an array of light source-integrated lens assemblies according to some embodiments of the present invention.

FIG. 8 is a schematic diagram of an optical apparatus including a light source-integrated lens assembly according to some embodiments of the present invention. FIG. 9 is a schematic diagram of an optical apparatus including an array of light source-integrated lens assemblies according to some embodiments of the present invention.

As shown in FIG. 8, an optical apparatus 800 according to some embodiments of the present invention includes at least one of the light source-integrated lens assembly 100 or the light source-integrated lens assembly 700.

In some embodiments of the present invention, the optical apparatus 800 is a fiber-optic scope including an optical fiber tube 810 and the light source-integrated lens assembly 100 or the light source-integrated lens assembly 700 arranged at a probe of the optical apparatus 800.

In some embodiments of the present invention, the optical apparatus 800 is a spectroscopic analyzing apparatus including the light source-integrated lens assembly 100 or the light source-integrated lens assembly 700 as a measurement head including a light source and a light receiving lens.

As shown in FIG. 9, a light source-integrated lens assembly array 900 according to some embodiments of the present invention includes a plurality of light source-integrated lens assemblies of a same type as the light source-integrated lens assembly 100 or the light source-integrated lens assembly 700.

The light source-integrated lens assembly array 900 includes light source-integrated lens assemblies according to some embodiments of the present invention are arranged in an array of a predetermined pattern on a two-dimensional plane.

The light source-integrated lens assembly array 900 can be used, for example, to measure skin status such as moisture content of the human skin.

The light source-integrated lens assembly 100 or the light source-integrated lens assembly 700 can be manufactured from semiconductor materials. For example, the light emitting element 120 can be fabricated as a light emitting diode (LED) chip or a laser diode (LD) chip, the lens 110 can be fabricated as a Fresnel lens by etching a semiconductor substrate, and the internal light shielding member 130 can be fabricated in the similar manner.

Therefore, employing the semiconductor-based light source-integrated lens assembly, the light source-integrated lens assembly array can be fabricated as a semiconductor-based light source-integrated lens assembly. It is a matter of course that such semiconductor-based structures are within the scope of the present invention.

Figure 10:
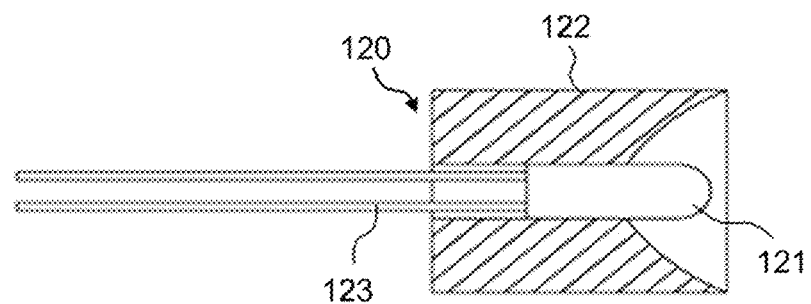
FIG. 10 is a cross-sectional view of a light emitting element (light source) according to some embodiments of the present invention.

FIG. 10 is a cross-sectional view of a light emitting element (light source) according to some embodiments of the present invention.

As shown in FIG. 10, the light emitting element 120 includes a cylindrical lamp body 122 formed of an aluminum material, a mini lamp 121 fixed with cement or epoxy at the center of the cylindrical lamp body 122, and a pair of leads 123 for supplying power to the mini lamp 121. The filament of the mini lamp 121 is designed to be positioned at the focal point (vertex) of an ellipsoidal reflecting plane of the cylindrical lamp body 122 such that light emitted from the filament of the mini lamp 121 is focused toward the target object T.

Figure 11:
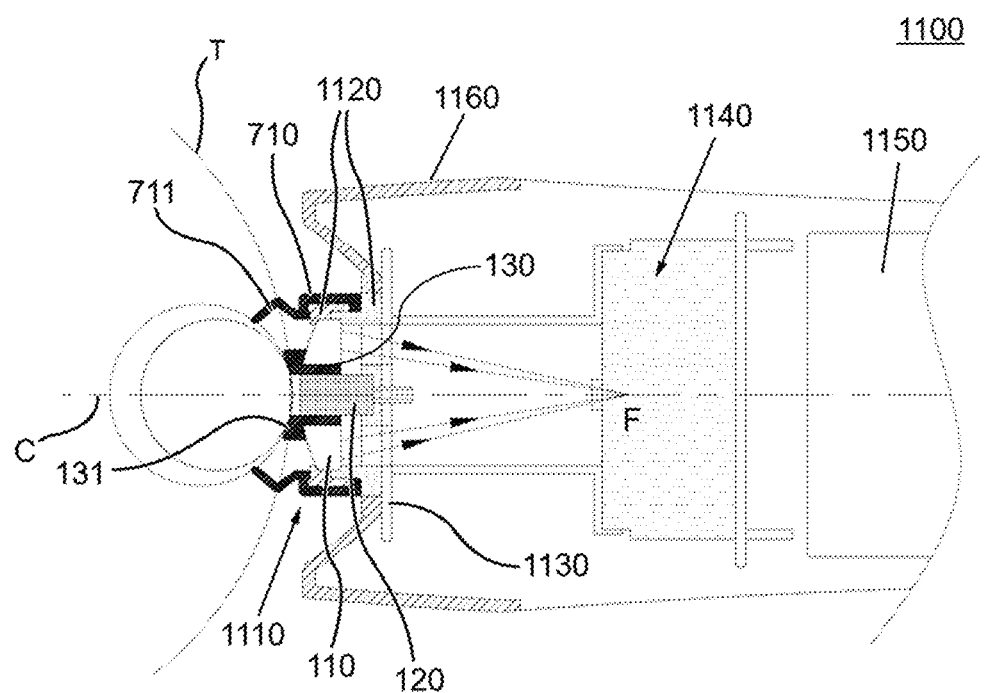
FIG. 11 is a partial cross-sectional view of a spectroscopic analyzing apparatus including a light source-integrated lens assembly according to some embodiments of the present invention.
Figure 12:
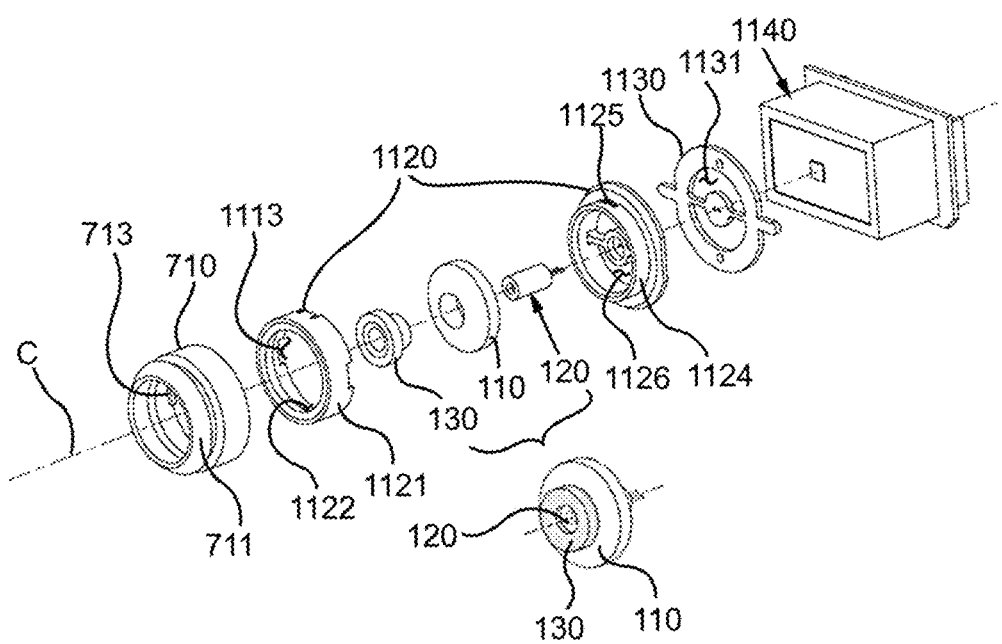
FIG. 12 is a partial exploded perspective view of the spectroscopic analyzing apparatus shown in FIG. 11.
Figure 13:
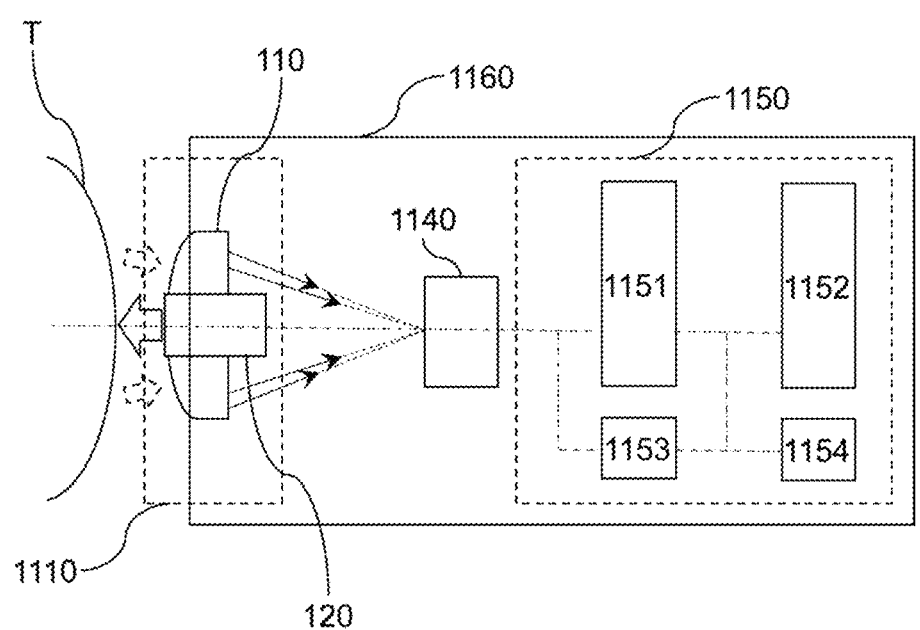
FIG. 13 is a block diagram of the spectroscopic analyzing apparatus shown in FIG. 11.
Figure 14:
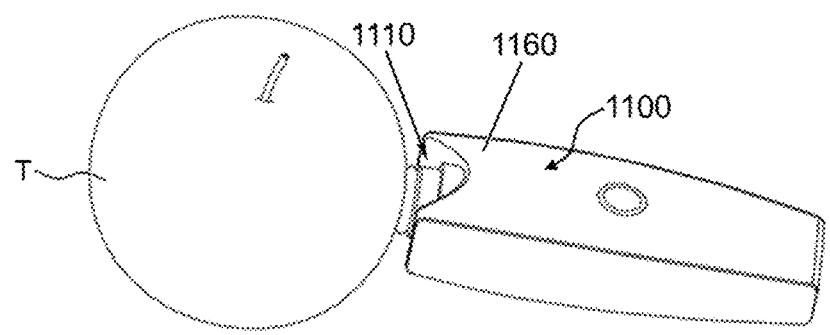
FIG. 14 is a perspective view of the spectroscopic analyzing apparatus shown in FIG. 11, instantiating a measurement of sugar contents of a fruit.

FIG. 11 is a partial cross-sectional view of a spectroscopic analyzing apparatus including a light source-integrated lens assembly according to some embodiments of the present invention. FIG. 12 is a partial exploded perspective view of the spectroscopic analyzing apparatus shown in FIG. 11. FIG. 13 is a block diagram of the spectroscopic analyzing apparatus shown in FIG. 11. FIG. 14 is a perspective view of the spectroscopic analyzing apparatus shown in FIG. 11, instantiating a measurement of sugar contents of a fruit.

As shown in FIGS. 11 to 14, the spectroscopic analyzing apparatus 1100 includes a body case 1160, a head unit 1110 arranged at the front end of the body case 1160, a spectrometer 1140 arranged in the body case 1160 at a predetermined distance from the head unit 1110, and a controller 1150.

The head unit 1110 makes contact with a surface of an target object T. In the example shown in FIG. 14, the target object T is a fruit such as an apple, an orange, or the like, and the spectroscopic analyzing apparatus 1100 measures the sugar contents of the fruit in a nondestructive manner.

The head unit 1110 includes a lens 110, an external light shielding member 710, a head case 1120, an internal light shielding member 130, a circuit board 1130, and a light emitting element (light source) 120.

The light emitting element 120 as a light emitting unit emits near-infrared light to the surface of the target object T. The light emitted from the light emitting element 120 penetrates the target object T and diffused and reflected from inside the target object T. The lens 110 as a light receiving unit light focuses the diffused and reflected light and transmits the focused light to the spectrometer 1140.

The controller 1150 includes a light detecting unit 1151, a communication unit 1152, a light-source driving unit 1153, and a power supply unit 1154.

The light detecting unit 1151 converts an analog signal outputted from the spectrometer 1140 to a digital signal to obtain spectrum data.

The communication unit 1152 transmits the spectrum data obtained by the light detecting unit 1151 to a computer, a smartphone, or the like via a USB connection or a Bluetooth connection.

The power supply unit 1154 supplies a power to the electric components of the spectroscopic analyzing apparatus 1100, which require an electric power. The controller 1150 can additionally perform functions of power driving, switching, and turning on and off various lamps to indicate an operation status.

When measuring the sugar contents of a fruit, for example, a user can hold the fruit with one hand and the body case 1160 of the spectroscopic analyzing apparatus 1100 with the other hand, keeps the head unit 1110 in a manner that the external light shielding member 710 makes contact with the surface of the fruit, and press a switch (not shown) on the body case 1160, to perform a measurement of the sugar contents of the fruit. A beep sound or an indicator can be used to prompt the user to maintain the contact between the external light shielding member 710 and the fruit.

In some embodiments of the present invention, a space for mounting the light emitting element 120 and a space for mounting the lens 110 are shared to minimize spaces occupied by the light emitting element 120 and the lens 110.

To this end, as shown in FIGS. 11 to 14, the lens 110 includes a first through hole 111 at its center, and the light emitting element 120 is arranged in the first through hole 111. With this arrangement, the light emitting element 120 and the lens 110 are arranged on the same optical axis.

The internal light shielding member 130 is formed of an elastic material, such as rubber. The inner surface of the internal light shielding member 130 makes tight contact with the light emitting element 120, and an outer surface of the internal light shielding member 130 makes tight contact with the inner wall of the first through hole 111, such that even when an impact is applied from the outside, the light emitting element 120 is stably held at the center of the first through hole 111.

The internal light shielding member 130 separates the light emitting element 120 from the lens 110 by a predetermined distance to prevent light reflected at the surface of the target object T or light diffused and reflected from a shallow depth being incident on the lens 110.

As shown in FIG. 11, an end portion of the internal light shielding member 130 protrudes from a surface of the lens 110. As the internal light shielding member 130 is formed of the elastic material, such as rubber, the internal light shielding member 130 makes contact with the target object T even when size or curvature of the target object T varies and securely separates a light emitting area from a light receiving area.

The external light shielding member 710 is arranged ahead of the body case 1160 to cover a portion of the target object T to be measured. The light emitting element 120 and the lens 110 are arranged on the inner side of the external light shielding member 710, so that the light emitting element 120 and the lens 110 are shielded from the outside. That is, the external light shielding member 710 prevents external natural light or scattered light from entering, such that the lens 110 is free from a penetration of such external light.

The external light shielding member 710 is formed of an elastic material, such as rubber, such that it can be used for various sizes and curvatures of the target object T. In some embodiments of the present invention, the external light shielding member 710 includes a folding portion 712 that can be folded when an external force is applied.

The light emitting element 120 is connected to the circuit board 1130, such that the power supplied by the light-source driving unit 1153 of the controller 1150 is applied thereto.

The circuit board 1130 includes a through hole 161 to allow the light passing through the lens 110 to be incident on the spectrometer 1140.

The head case 1120 includes a front case 1121 and a rear case 1124 that can be assembled together. A lens assembly including the light emitting element 120, the lens 110, and the internal light shielding member 130 is arranged inside the head case 1120. The external light shielding member 710 is coupled to the front of the front case 1121, and the circuit board 1130 is arranged at the back of the rear case 1124.

The front case 1121 and the rear case 1124 include a hook 1122 and a groove 1125 that can be coupled to each other, the front case 1121 includes a groove 1123 to which a protrusion 713 protruded backwardly on the inner side of the external light shielding member 710 is coupled, and the rear case 1124 includes a through hole (not shown) to allow the light passing through the lens 110 to be incident on the spectrometer 1140.

Figure 15:
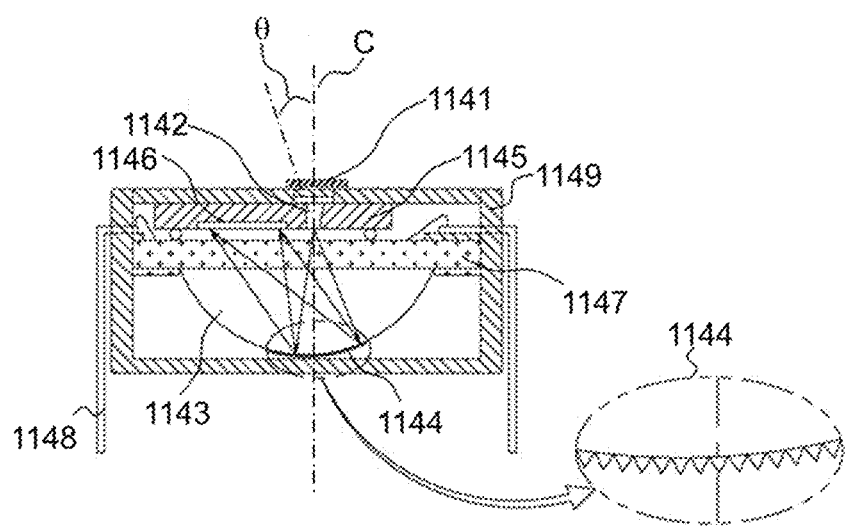
FIG. 15 is a cross-sectional view of a spectrometer of the spectroscopic analyzing apparatus shown in FIG. 11.
Figure 16:
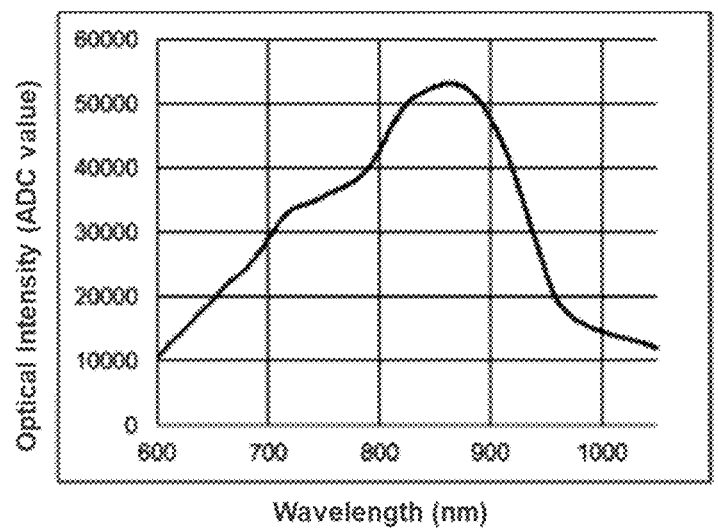
FIG. 16 is a graph showing an example of wavelength spectra of an output signal from the spectrometer shown in FIG. 15.

FIG. 15 is a cross-sectional view of a spectrometer of the spectroscopic analyzing apparatus shown in FIG. 11. FIG. 16 is a graph showing an example of wavelength spectra of an output signal from the spectrometer shown in FIG. 15.

The spectrometer 1140 includes a body 1149, an input slit 1142 arranged to make a straight line with an optical axis C on the inner side of the body 1149, a silicon substrate 1145 in which the input slit 1142 is formed, an image sensor 1146 mounted on the silicon substrate 1145, a transparent glass circuit board 1147 coupled to the bottom surface of the silicon substrate 1145 and including an electric circuit pattern thereon, a convex lens 1143 arranged at the bottom of the transparent glass circuit board 1147 and including a diffraction grating 1144 on its outer surface, and a lead frame 1148 electrically connected to the transparent glass circuit board 1147.

The spectrometer 1140 further includes a thinfilm optical filter 1141 on its optical path. The thinfilm optical filter 1141 increases transmissivity of light in a wavelength band having high correlation with a measurement factor of the target object T. This improves the signal-to-noise ratio, thus increasing precision and accuracy of the measurement. In addition, the thinfilm optical filter 1141 blocks light in an unnecessary wavelength band, and hence scattered light is suppressed in the spectrometer 1140.

The spectrometer 1140 is fixed to the body case 1160 in a manner that the input slit 1142 of the spectrometer 1140 is positioned at the focal length of the lens 110 arranged in the head unit 1110. In this case, the diameter and the focal length of the lens 110 are determined by the effective incident angle (numerical aperture) θ of the input slit 1142. With this arrangement, the spectrometer 1140, the lens 110, and the light emitting element 120 are arranged in a straight line on the optical axis C.

With the above structure, the light diffused and reflected from inside the target object T is focused via the lens 110, a light beam passed through the thinfilm optical filter 1141 and within the effective incident angle θ only passes through the input slit 1142, and the light diffused with a limited size is separated for each wavelength by the diffraction grating 1144 formed on the surface of the convex lens 1143, and the light of each wavelength is converted to a photocurrent at each pixel of the image sensor 1146, and the spectroscopic spectrum data shown in FIG. 16 are generated at the light detecting unit 1151 via the lead frame 1148.

The spectroscopic analyzing apparatus 1100 can downsize the light emitting element 120 and the lens 110 in the head unit 1110, and hence the entire shape of the spectroscopic analyzing apparatus 1100 has a size compact enough to easily operate by simply making contact with the surface of the target object T.

In addition, the structure according to some embodiments of the present invention can provide a spectroscopic analyzing apparatus that is portable and carriable, which is a compact and pocket-sized spectroscopic analyzing apparatus that is capable of measuring the internal quality of fruits, drink, food, and the like in a nondestructive manner, for which the internal quality, components, and the like cannot be determined from what one can see.

The spectroscopic analyzing apparatus according to some embodiments of the present invention configured in the above manner has a structure in which the light source as a light emitting unit and the lens as a light receiving unit are arranged at the same position on a plane perpendicular to the optical axis, and hence the spectroscopic analyzing apparatus can be downsized by minimizing the space occupied by the light source and the lens. In addition, the lens and the spectrometer are arranged on the optical axis of the light source, it is less affected by differences in size and shape of the object, and as a result, the penetration of the light can be increase in depth and width. Further, as the internal light shielding member minimizes the light interference between the light source and the lens, the precision and the accuracy of the spectroscopic measurement can be enhanced with a compact structure.

The present disclosure should not be limited to these embodiments but various changes and modifications are made by one ordinarily skilled in the art within the subject matter, the spirit and scope of the present disclosure as hereinafter claimed. Specific terms used in this disclosure and drawings are used for illustrative purposes and not to be considered as limitations of the present disclosure.

Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

What is claimed is:

1. A light source-integrated lens assembly, comprising:
   a lens including a first through hole at its center along an optical axis thereof;
   an internal light shielding member including a second through hole at its center along the optical axis and a first protrusion that protrudes from a front surface of the lens, the front surface facing a target object; and
   a light emitting element configured to emit light to the target object, wherein
   the internal light shielding member is fitted into the first through hole of the lens and the light emitting element is fitted into the second through hole of the internal light shielding member to form a single integrated unit,
   the lens is configured to receive light emitted from the light emitting element and diffused and reflected from inside the target object,
   when the internal light shielding member is brought into contact with a surface of the target object, the internal light shielding member is configured to prevent light emitted from the light emitting element and directly reflected at the surface of the target object from being incident on the lens,
   an outer diameter of the internal light shielding member is substantially same as an inner diameter of the first through hole, and
   an outer diameter of the light emitting element is substantially same as an inner diameter of the internal light shielding member.

2. The light source-integrated lens assembly according to claim 1, wherein at least the first protrusion of the internal light shielding member is formed of an elastic material.

3. The light source-integrated lens assembly according to claim 1, further comprising an external light shielding member surrounding an outer circumference of the lens, the external light shielding member including a second protrusion that protrudes from the front surface of the lens, wherein
   when the external light shielding member is brought into contact with the surface of the target object, the external light shielding member is configured to prevent external light or ambient light from being incident on the lens.

4. The light source-integrated lens assembly according to claim 3, wherein at least the second protrusion of the external light shielding member is formed of an elastic material.

5. The light source-integrated lens assembly according to claim 3, wherein
   the second protrusion of the external light shielding member protrudes farther than the first protrusion of the internal light shielding member toward the target object, and
   the second protrusion of the external light shielding member includes a folding portion that is foldable when an external force is applied.

6. The light source-integrated lens assembly according to claim 3, wherein when the internal light shielding member and the external light shielding member are brought into contact with the surface of the target object, the first protrusion of the internal light shielding member and the second protrusion of the external light shielding member are configured to form a confined space between the surface of the target object and the front surface of the lens.

7. A light source-integrated lens assembly array, comprising a plurality of light source-integrated lens assemblies of a same type as the light source-integrated lens assembly according to claim 1, wherein
   the light source-integrated lens assemblies are arranged in an array of a predetermined pattern on a two-dimensional plane.

8. An optical apparatus, comprising the light source-integrated lens assembly according to claim 1.

9. An optical apparatus, comprising the light source-integrated lens assembly array according to claim 7.

10. A light source-integrated lens assembly, comprising:
    a lens including a first through hole at its center along an optical axis thereof;
    an internal light shielding member including a second through hole at its center along the optical axis; and
    a light emitting element configured to emit light to a target object, wherein
    an outer diameter of the internal light shielding member is substantially same as an inner diameter of the first through hole,
    an outer diameter of the light emitting element is substantially same as an inner diameter of the internal light shielding member, and
    the internal light shielding member is fitted into the first through hole of the lens and the light emitting element is fitted into the second through hole of the internal light shielding member, such that the light emitting element, the internal light shielding member, and the lens are integrated into a single unit in a concentric manner centering around the optical axis.

11. The light source-integrated lens assembly according to claim 10, wherein the internal light shielding member includes a first protrusion that protrudes from a front surface of the lens, the front surface facing the target object.

12. The light source-integrated lens assembly according to claim 10, further comprising an external light shielding member surrounding an outer circumference of the lens, wherein
    an outer diameter of the lens is substantially same as an inner diameter of the external light shielding member, and
    the internal light shielding member is fitted into the first through hole of the lens, the light emitting element is fitted into the second through hole, and the lens is surrounded by the external light shielding member, such that the light emitting element, the internal light shielding member, the lens, and the external light shielding member are integrated into a single unit in a concentric manner centering around the optical axis.

13. The light source-integrated lens assembly according to claim 12, wherein the external light shielding member includes a second protrusion that protrudes from the front surface of the lens.

14. The light source-integrated lens assembly according to claim 13, wherein the second protrusion of the external light shielding member includes a folding portion that is foldable when an external force is applied.

15. The light source-integrated lens assembly according to claim 10, further comprising:
a frame surrounding an outer circumference of the lens; and
an external light shielding member surrounding an outer circumference of the frame, wherein
an outer diameter of the lens is substantially same as an inner diameter of the frame,
an outer diameter of the frame is substantially same as an inner diameter of the external light shielding member, and
the internal light shielding member is fitted into the first through hole of the lens, the light emitting element is fitted into the second through hole, the lens is surrounded by the frame, and the frame is surrounded by the external light shielding member, such that the light emitting element, the internal light shielding member, the lens, the frame, and the external light shielding member are integrated into a single unit in a concentric manner centering around the optical axis.

16. The light source-integrated lens assembly according to claim 15, wherein the external light shielding member includes a second protrusion that protrudes from the front surface of the lens.

17. The light source-integrated lens assembly according to claim 16, wherein the second protrusion of the external light shielding member includes a folding portion that is foldable when an external force is applied.

18. A light source-integrated lens assembly array, comprising a plurality of light source-integrated lens assemblies of a same type as the light source-integrated lens assembly according to claim 10, wherein
the light source-integrated lens assemblies are arranged in an array of a predetermined pattern on a two-dimensional plane.

19. An optical apparatus, comprising the light source-integrated lens assembly according to claim 10.

20. An optical apparatus, comprising the light source-integrated lens assembly array according to claim 18.

21. A light source-integrated lens assembly, comprising:
a lens including a first through hole at its center along an optical axis thereof;
an internal light shielding member including a second through hole at its center along the optical axis and a first protrusion that protrudes from a front surface of the lens, the front surface facing a target object;
a light emitting element configured to emit light to the target object; and
an external light shielding member surrounding an outer circumference of the lens, the external light shielding member including a second protrusion that protrudes from the front surface of the lens, wherein
the internal light shielding member is fitted into the first through hole of the lens and the light emitting element is fitted into the second through hole of the internal light shielding member to form a single integrated unit,
the lens is configured to receive light emitted from the light emitting element and diffused and reflected from inside the target object,
when the internal light shielding member is brought into contact with a surface of the target object, the internal light shielding member is configured to prevent light emitted from the light emitting element and directly reflected at the surface of the target object from being incident on the lens, and
when the external light shielding member is brought into contact with the surface of the target object, the external light shielding member is configured to prevent external light or ambient light from being incident on the lens.

* * * * *